United States Patent [19]

Keske et al.

[11] 4,048,131
[45] Sept. 13, 1977

[54] POLYOXYETHYLENE ALKYL ETHER ADDITIVES IN IMPACT RESISTANT COMPOSITIONS OF POLYPROPYLENE

[75] Inventors: Robert G. Keske, Naperville; Wassily W. Poppe, Lombard; Ivor R. Fielding, Naperville, all of Ill.

[73] Assignee: Standard Oil Company (Indiana), Chicago, Ill.

[21] Appl. No.: 599,086

[22] Filed: July 25, 1975

[51] Int. Cl.$^2$ .............................................. C08K 5/06
[52] U.S. Cl. ....................................... 260/33.2 R
[58] Field of Search ................................. 260/33.2 R

[56] References Cited

U.S. PATENT DOCUMENTS

| | | | |
|---|---|---|---|
| 2,978,431 | 4/1961 | Engle | 260/33.2 R |
| 3,206,419 | 9/1965 | Pritchard et al. | 260/33.2 R |
| 3,658,980 | 4/1972 | Caiola et al. | 260/33.2 R |
| 3,872,052 | 3/1975 | Fielding et al. | 260/33.2 R |

OTHER PUBLICATIONS

Morita et al., *Japanese Application No. S45-103,431,* Nov. 24, 1970.

*Primary Examiner*—Harry Wong, Jr.
*Attorney, Agent, or Firm*—Stanley M. Welsh; A. C. Gilkes; William J. McClain

[57] ABSTRACT

When incorporated into formulations, polyoxyethylene alkyl ether derivatives both increase the impact resistance and the flow rate of polypropylene compositions.

9 Claims, No Drawings

POLYOXYETHYLENE ALKYL ETHER ADDITIVES IN IMPACT RESISTANT COMPOSITIONS OF POLYPROPYLENE

BACKGROUND OF THE INVENTION

1. Field of the Invention

The field of this invention is that of flow rate and impact modifiers for polypropylene resin compositions.

2. Prior Art

A well known approach to increasing impact properties of polypropylene resins is to add ethylene-propylene copolymer rubbers and diene modifications thereof. Unfortunately, conventional additives when incorporated into polypropylene compositions while increasing impact resistance decrease the flow rate. An example of increased impact resistance coupled with decreased flow rates is shown in Table I.

"Impact resistance" is herein used to mean either the Izod impact strength as measured by ASTM D-256 wherein a sample is either notched or unnotched and tested at room temperature, or the Gardner impact test which involves a value determined from dropping a weight measured in pounds from a height measured in inches so as to just crack a 2 × 3 × 0.1 inch injection molded plaque which is at a temperature of −20° F. The Gardner impact test, accurate to plus or minus 10%, is described in Paint Testing Manual edited by G. G. Sward and published as the ASTM Special Technical Publication 500, 13th Edition, page 335 (1972).

Flow rates as used throughout this specification and claims are defined to mean the number of grams flowing in 10 minutes as determined by ASTM D1238 Condition L.

The materials used in TABLE I are as follows:

Polypropylene 1001 which is commercially available from Amoco Chemicals Corporation having a flow rate of approximately 0.5-0.9 grams/ 10 minutes;

Polypropylene 1004 which is commercially available from Amoco Chemicals Corporation having a flow rate of approximately 2.4-4.0 grams/10 minutes;

Polypropylene 1008 which is commercially available from Amoco Chemicals Corporation having a flow rate of approximately 7-11 grams/10 minutes;

ECD 3252 which was obtained from E. I. du Pont de Nemours is a propylene/diene/ethylene terpolymer composed of 25% bound propylene, 2.7% bound 1,4-hexadiene, and 72.3% bound ethylene; and Metrotalc 4615 which is a commercially available talc obtainable from Whittaker, Clark and Daniels.

Flow rates are directly related to the ease of which a mold cavity can be filled. A range of flow rates typically used in molding is 6-8 grams/10 minutes. Unfortunately, often no workable trade-off in flow rate and impact resistance can be found that will permit use of polypropylene having a flow rate near 6. This is often the case even though less modifier is required for lower flow rate polypropylene than higher flow rate polypropylene to achieve a significant increase in impact resistance as measured by the Gardner impact method at −20° F.

It is an object of this invention to utilize in polypropylene compositions an impact modifier additive which will increase both impact resitance at room temperature and flow rate without significantly lessening flexural modulus or heat deflection temperatures.

Other objects are obvious to those skilled in the art based on the teachings disclosed herein.

BRIEF DESCRIPTION OF THE INVENTION

Derivatives for polypropylene resins, which resins alone have flow rates in the range 0.2 to 25 g/10 minutes, have been found which increase both impact strength and flow rates. These derivatives have the general chemical structure:

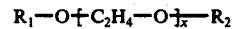

where $R_1$ is

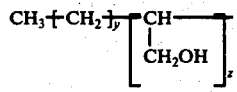

and $R_2$ is either H or $R_1$, wherein the $x$, $y$, $z$, and $R_2$ are selected from the groups of $x$, $y$, $z$, and $R_2$, respectively, consisting of: 3-10, 12-15, 1, and H; 7-11, 12-15, 1, and $R_1$; 12-14, 8-11, 1, and $R_1$; and 5-12, 11-13, 0, and H; and preferably, 3-6, 12-15, 1, and H; 7-10, 12-15, 1, and $R_1$; and 5-7, 11-13, 0, and H.

Other uses of polyoxyethylene and derivatives thereof involve their general ability to increase flow rates of polypropylene compositions. These polypropylene compositions can be with or without impact or stiffening modifiers provided said modifiers are unreactive chemically with the polyoxyethylene alkyl ether derivatives used. Some typical impact modifiers used in a weight percent range of 5-30% are ethylene-propylene copolymer rubbers, having 40 to 75% bound ethylene and diene modifications thereof. By diene modification is meant the incorporation of 0-5% by weight bound diene into the polymer. Some typical stiffening agents used in a weight percent range of 0-30% are talc, calcium carbonate, lithopone, titanium dioxide, hydrated aluminas, fiberglass, and clays, etc.

The compatibility of polyoxyethylene alkyl ether derivatives in polypropylene increases with increased chain length of the alkyl derivative. Linear alkyls tend to cause greater compatibility than either branched or cyclic alkyls of comparable weight. Benzene rings tend to inhibit compatibility and are therefore undesirable.

TABLE 1

| Type of Polypropylene Used in a composition Modified with 20% ECD 3252 and 10% Metrotalc 4615 | FLOW RATE* with modifiers (without modifiers) | NOTCHED IZOD (Room Temp.) | GARDNER IMPACT (−20° F) with modifiers (without modifiers) |
|---|---|---|---|
| 1001 | 0.54 (.7) | 9.50 | 120 (0-2) |
| 1004 | 2.8 (5.4) | 2.20 | 94-96 (0-2) |
| 1008 | 6.1 (8.0) | 1.03 | 76 (0-2) |

*All flow rates were measured except for 1001 and 1008 (without modifiers). These exceptions are typical values.

Molded parts made from compatible polymer compositions tend to delaminate easily depending upon the relative concentration of each polymer. The incompatible polymers tend to segregate in layers or regions during the molding process.

Polyoxyethylene alkyl ether derivatives generally have a consistency of from a liquid to a soft wax at room temperature. Too little polyoxyethylene derivative in polypropylene compositions does not give rise to a measurable effect. The effectiveness of each polyoxyethylene derivative varies. However some effect is generally observed above a weight percent of 0.5% of polyoxyethylene derivative based on the total composition. Too much polyoxyethylene derivative results in a sticky or tacky blend directly correlatable with the polyoxyethylene's liquid or waxy state when pure. In most applications, a sticky or tacky blend is undesirable and when a weight percent above 10%, based upon the total composition, of the polyoxyethylene derivative in polypropylene is used, there generally results a sticky blend. In practice, a range of 2-6 percent by weight is preferred.

DETAILED DESCRIPTION OF THE INVENTION

EXAMPLE 1

The effect of various polyoxyethylene alkyl ether derivatives upon the physical properties of propylene 1004 are shown in TABLE 2. It should be noted that there is an increase in both flow rate and impact resistance at room temperature without a corresponding decrease in flexural modules and heat deflection temperature.

Some of the materials used in TABLE 2 are: 182, 183, 184, 185 and 189 which are polyoxyethylene alkyl ether derivatives synthesized as hereinafter discussed.

182 is made in a 1 to 1 molar ratio reaction between Nedox 1518 and E 400. 183 is made by a 2 to 1 molar reaction between Nedox 1518 and E 400. 184 is made in a reaction having a 2 to 1 molar ratio of Nedox 1518 to E 200. 185 is made in a reaction involving a 1 to 1 molar ratio between Nedox 1518 and E 200. 189 is made in a reaction involving a 2 to 1 mole ratio of Nedox 1114 and E 600.

The reactants beginning with E are polyoxyethylene glycols having an average molecular weight equal to the number following the E and were obtained from Dow Chemical Company, Midland, Michigan. The reactant Nedox 1114 is a linear monomer having a linear carbon chain with a terminal epoxide group. The number of carbon atoms in said linear chain range from 11 to 14 carbon atoms. Similarly, Nedox 1518 is a linear carbon chain containing 15 to 18 carbon atoms including a terminal epoxide group. The Nedox series of compounds is obtainable from Ashland Chemicals.

An example of the reaction followed to produce the alkyl derivatives of polyoxyethylene glycol is as follows: a mixture of 300 grams of E 600, and 1 ml. of boron trifluoride diethyl ether complex were placed in a 1 liter round bottomed flask and stirred under nitrogen; to this mixture was added over a 1 hour period 250 grams Nedox 1518 in 400 ml. of dry methylene chloride; after the addition, the reaction was stirred an additional 1.5 hr., 200 ml. of methylene chloride is then added and the solution extracted twice with 100 ml. of 5% sodium bicarbonate; after being dried, the solvent was removed under reduced pressure (23 mm Hg) with heating (100° C) to give approximately 527 grams of product.

It is to be noted that the above synthesis employs Lewis acid catalysis through the use of a boron trifluoride diethyl ether complex. The result of this is to cause the epoxide ring to open in such a manner as to form a primary alcohol, i.e., the polyglycol forms a bond to the $\beta$-carbon in the epoxide ring. If base catalysis is employed, then a secondary alcohol is formed, i.e. the polyglycol forms a bond to the $\alpha$-carbon in the epoxide ring. Compounds formed by base catalysis will also increase both flow rate and impact resistance of polypropylene resin compositions.

The location of the hydroxide group will also depend upon the location of the epoxide ring in the alkyl radical. Epoxide rings can be synthesized at other than the terminal positions of alkyl chains.

TABLE 2

| THE EFFECT OF POLYGLYCOLS ON THE PROPERTIES OF 1004 POLYPROPYLENE | | | | | | |
|---|---|---|---|---|---|---|
| Additives | | | | | | |
| 182 | — | 4% | — | — | — | — |
| 183 | — | — | 4% | — | — | — |
| 184 | — | — | — | 4% | — | — |
| 185 | — | — | — | — | 4% | — |
| 189 | — | — | — | — | — | 4% |
| Flow Rate (-G/10 min.) | | | | | | |
| Condition L | 5.4 | 6.2 | 6.0 | 5.7 | 5.7 | 8.1 |
| Izod Impact Strength (ft-lb/in., ⅛ in. bar) | | | | | | |
| Notched at 73° F | 0.33 | 0.62 | 0.52 | 0.47 | 0.50 | 0.52 |
| Unnotched at 73° F | 25.28 | no break | no break | no break | no break | no break |
| Tensile Properties | | | | | | |
| Yield Tensile Strength (psi) | 5390 | 4690 | 4850 | 4790 | 4810 | 4800 |
| Ultimate Tensile Strength (psi) | 3065 | 3060 | 3200 | 3100 | 3180 | 1380 |
| Elongation at Yield (%) | 10.5 | 6.5 | 8.9 | 11 | 10 | 7.5 |
| Elongation at Break (%) | 99.5 | 110 | 91 | 130 | 74 | 400 |
| Flexural Modulus (psi) | 183,000 | 199,000 | 198,000 | 187,000 | 180,000 | 198,000 |
| Rockwell Hardness | 91R | 89R | 89R | 87R | 88R | 93R |
| Heat Deflection Temp. (° F at 66 psi) | 196 | 211 | 201 | 208 | 198 | 216 |

EXAMPLE 2

The effect of various polyoxyethylene alkyl ethers upon Gardner impact values measured when the sample is at −20° F are shown in TABLE 3.

From TABLE 3, it is clear that polyoxyethylene alkyl ether derivatives having the following $x$, $y$, $z$, and $R_2$ values, are useful flow and impact modifiers in polypropylene compositions; the $x$, $y$, $z$, and $R_2$ are selected from the groups of $x$, $y$, $z$, and $R_2$, respectively, consisting of: 3-10, 12-15, 1, and H; 7-11, 12-15, 1, and $R_1$; 12-14, 8-11, 1, and $R_1$; and 5-12, 11-13, 0, and H.

The values for $x$ in TABLE 3 are not whole numbers for additives 182, 183, 184, 185 and 189 because the polyoxyethylene glycol starting compounds used to make them were a mixture of polyoxyethylene glycols having varying chain lengths. For example, E 400 has an average molecular weight of 400 and in the formula HO—$CH_2CH_2$—O—H for E 400, $n$ has a value of approximately 8.7. Similarly for E 200, and E 600, $n$ has a value of approximately 4.1 and 13.2, respectively.

The values for $y$ in TABLE 3 have a range in values because the starting reactant to make 182, 183, 184, and 185 was Nedox 1518 and that for 189 was Nedox 1114. Nedox 1114 and Nedox 1518 have a range in linear carbon chain length of 11-14 and 15-18 carbons, respectively.

It should be noted further that the reaction procedure followed in preparing mono-substituted polyoxyethylene from the reaction of Nedox 1518 and E 400 in the case of 182, and from the reaction of Nedox 1518 and E 200 in the case of 185 necessarily results in a mixture of mono- and di-substituted polyoxyethylenes with the predominant product being mono-substituted. This is clear from the ratio of reactants used, i.e., 1-to-1 molar ratios.

We have determined that Gardner Impact values for mixtures of polyoxyethylene alkyl ether derivatives (hereinafter referred to as derivatives) in polypropylene compositions lie between values for such compositions having pure or unmixed derivative therein. For example, compositions of polypropylene containing various ratios of Brij 52:Renex 31, wherein the total weight percent concentration of derivatives is 4%, have Gardner Impact values between 10 ± 1 and 31 ± 3, which are the Gardner Impact values for the ratios of Renex 31:Brij 52 of 1:0 and 0:1, respectively. Some representative Gardner Impact values of polypropylene compositions having ratios of Renex 31:Brij 52 of 2:1, 1:1, and 1:2 are 20, 11, and 27, respectively. In summary, the Gardner Impact value for a mixture of derivatives in polypropylene is lower than the Gardner Impact value for some derivative of said mixture when used alone in a polypropylene composition in percent by weight equal to that of said total mixture.

Referring to TABLE 3, and noting that the fraction of di-substituted derivatives increases in going from 182 to 183, and that the Gardner Impact values go from 69 to >80, it is clear that an increase in the fraction of the di-substituted derivatives increases significantly the Gardner Impact values. The mono-substituted derivatives with $x$ and $y$ values about 8.7 and about 12-15, respectively, are poorer than the di-substituted derivatives. In contrast, since the di-substituted derivatives increased in going from 185 to 184 and the Gardner Impact values go from 57-60 to 38, it is clear that by increasing the fraction of di-substituted derivative decreases the Gardner Impact values in the case of 184 and 185. The mono-substituted derivatives with $x$ and $y$ values about 4.1 and 12-15, respectively, are better than the di-substituted derivatives. Therefore, some preferred ranges based upon 182, 183, 184, and 185 for $x$, $y$, $z$, and $R_2$ taken as a group are: 3-6, 12-15, 1, and H, and 7-10, 12-15, 1, and $R_1$. These values limit the $x$ value in the mono-substituted derivatives to the range 3-6, i.e. close to 4.1, whereas the $x$ value in the di-substituted derivatives is limited to 7-10, i.e. close to 8.7.

From TABLE 3, the general ranges based upon Renex 36 and Renex 30 for $x$ and $y$ are respectively, 5-12 and 11-13 when $z$ and $R_2$ are O and H, respectively. However, the Gardner Impact value decreases in going from Renex 36 to Renex 30 and therefore values closer to a value of about 6 for $x$ and of about 12 for $y$ are preferred, i.e., $x$ in the range 5-7 and $y$ in the range 11-13. In summary, a preferred $x$, $y$, $z$, and $R_2$ taken as a group are 5-7, 11-13, 0, and H, respectively.

The compounds used in TABLE 3 are hereinafter discussed:

Renex 30 is a polyoxyethylene (12)* tridecyl ether having a molecular weight of 728, a specific gravity at 25° C of approximately 1.0, a viscosity at 25° of approximately 60 cps., and a hydrophile-lipophile balance (HLB) number of 14.5. This material is obtainable from Atlas Chemical Industries, Inc. Hydrophile-lipophile balance number is defined to be 1/5 of the weight percent of the hydrophilic content of the molecule. (Kirk-Othmer, Encyclopedia of Chemical Technology 2nd Edition, V8, pages 131ff(1965).

Renex 31 is a compound having a molecular weight of 860, a specific gravity at 25° of approximately 1.0, a viscosity at 25° of approximately 130 cps., and an HLB number of 15.4. Renex 31 is polyoxyethylene (15)* tridecyl ether obtainable from Atlas Chemical Industries, Inc.

Renex 36 is a compound having a specific gravity at 25° of approximately 1.0, a viscosity at 25° of approximately 80 cps., and an HLB number of 11.4. Renex 36 is polyoxyethylene (6)* tridecyl ether obtainable from Atlas Chemical Industries, Inc.

Brij 52 is a compound having a molecular weight of 330, and having an HLB number 5.3 Brij 52 is polyoxyethylene (2)* cetyl ether obtainable from Atlas Chemical Industries, Inc.

Brij 56 is a compound having a molecular weight of 682 and having an HLB number of 12.9. Brij 56 is polyoxyethylene (10)* octyl ether obtainable from Atlas Chemical Industries, Inc.

Brij 72 is a compound having a molecular weight of 358 and an HLB number of 4.9. Brij 72 is polyoxyethylene (2)* stearyl ether obtainable from Atlas Chemical Industries, Inc.

Brij 76 is a compound having a molecular weight of 712 and an HLB number of 12.4. Brij 76 is polyoxyethylene (10)* stearyl ether obtainable from Atlas Chemical Industries, Inc.

* The number in parentheses indicates the number of ethylene oxide units present.

TABLE 3
THE CHANGES IN GARDNER IMPACT VALUES OF POLYPROPYLENE COMPOSITIONS* CAUSED BY VARIOUS POLYOXYETHYLENE ALKYL ETHER DERIVATIVES $R_1-O+CH_2CH_2O\overline{\jmath_x}-R_2$ where

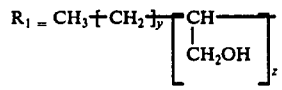

| Additive (4%) | x | y | z | $R_2$ Predominantly | Gardner Impact (at $-20°$ F) |
|---|---|---|---|---|---|
| none | — | — | — | — | 30 |
| 182 | 8.7 | 12–15 | 1 | H | 69 |
| 185 | 4.1 | 12–15 | 1 | H | 57–60 |
| 183 | 8.7 | 12–15 | 1 | $R_1$ | >80 |
| 184 | 4.1 | 12–15 | 1 | $R_1$ | 38 |
| 189 | 13.2 | 8–11 | 1 | $R_1$ | 76–77 |
| Brij 72 | 2 | 17 | 0 | H | 32 |
| Brij 52 | 2 | 15 | 0 | H | 31 |
| Renex 36 | 6 | 12 | 0 | H | >80 |
| Brij 56 | 10 | 15 | 0 | H | 30 |
| Brij 76 | 10 | 17 | 0 | H | 12 |
| Renex 30 | 12 | 12 | 0 | H | 40 |

*Each composition contains;
Polypropylene 1001 obtained from Amoco Chemicals and having a flow rate of approximately 0.7; 15% ECD 2913 which is a blend of 33% high density polyethylene (a product of USI called Petrothene LB 861), and 67% Nordel 1145 (an ethylene-propylene diene modified rubber composed of 32% bound propylene, 3% bound nonconjugated hexadiene, and 65% bound ethylene). Typical stabilizers for polypropylene of .65% such as bis-(nonyl-phenyl) phosphite, a tris-phenol (a hindered phenol) and distearylthiodipropionate.

EXAMPLE 3

TABLE 4 shows the effect of Renex 36 on a polypropylene composition containing polypropylene 1004 and 12% of SP-992 EPR. The compound SP-992 is an ethylene-propylene copolymer rubber obtained from Copolymer Rubber and Chemicals Company.

It is clear that Renex 36 can be used as a flow rate modifier of impact modified polypropylene. What is particularly significant is that the Renex 36 while increasing the flow rate from 4.0 to 5.4 also improves impact strength as shown by Izod and Gardner impact values.

TABLE 4
THE EFFECT OF RENEX 36 ON THE PROPERTIES OF 12% SP-992 EPR FILLED 1004 POLYPROPYLENE

| Additives | | | |
|---|---|---|---|
| % SP-992 EPR | 12 | 12 | 12 |
| % Renex 36 | — | 2 | 4 |
| Flow Rate (-G/10 min.) | 4.0 | 4.7 | 5.4 |
| Izod Impact Strength (ft-lb/in., ⅛ in. bar) | | | |
| Notched at 73° F | 1.48 | 1.48 | 1.61 |
| Unnotched at 73° F | no break | no break | no break |
| Tensile Properties | | | |
| Yield Tensile Strength (psi) | 4270 | 3970 | 3770 |
| Ultimate Tensile Strength (psi) | 2270 | 2040 | — |
| Elongation at Yield (%) | 9.28 | 11.3 | 5.4 |
| Elongation at Break (%) | 257 | 365 | — |
| Flexural Modulus (psi) | 178,000 | 153,000 | 137,000 |
| Rockwell Hardness | 78R | 71R | 65R |
| Heat Deflection Temp. (° F at 66 psi) | 195 | 183 | 175 |
| Gardner Impact (in-lb at $-20°$ F) | 44–46 | 38 | 98 |

EXAMPLE 4

TABLE 5 shows the effect of Renex 36 on properties of ECD 3252 filled 1004 polypropylene. Improved flow rate results upon the addition of Renex 36 along with an increase in impact strength as measured by Izod impact method.

TABLE 5
THE EFFECT OF RENEX 36 ON THE PROPERTIES OF ECD 3252 FILLED 1004 POLYPROPYLENE

| Addtives | | | | | |
|---|---|---|---|---|---|
| % ECD 3252 | 15 | 15 | 15 | 12 | 10 |
| % Renex 36 | — | 4 | 5 | 5 | 7 |
| Flow Rate (-G/10 min.) | | | | | |
| Condition L | 4.1 | 4.6 | 5.0 | 5.3 | 6.4 |
| Izod Impact Strength (ft-lb/in., ⅛ in. bar) | | | | | |
| Notched at 73° F | 1.04 | 1.57 | 1.54 | 1.38 | 1.27 |
| Unnotched (at 73° F | no break | no break | no break | no break | no break |
| Tensile Properties: | | | | | |
| Yield Tensile Strength (psi) | 4110 | 3630 | 3540 | 3770 | 3640 |
| Ultimate Tensile Strength (psi) | 2850 | 2880 | 2920 | 2480 | 2620 |
| Elongation at Yield (%) | 5.9 | 11 | 12 | 9.7 | 9.5 |
| Elongation at Break (%) | 220 | 210 | 330 | 150 | 210 |
| Flexural Modulus (psi) | 162,000 | 142,000 | 140,000 | 142,000 | 138,000 |
| Rockwell Hardness | 81R | 49R | 45R | 50R | 52R |
| Heat Deflection Temp. (° F at 66 psi) | 189 | 198 | 179 | 198 | 187 |
| Gardner Impact (in-lb at $-20°$ F) | 34–35 | 40–41 | 92 | 34–36 | 35 |

EXAMPLE 5

The effect of Renex 36 on polypropylene 1004 composition containing 10% talc and ECD 3252 is shown in TABLE 6. The presence of the 10% talc does not prevent or inhibit the ability of Renex 36 to increase flow rates and impact strength.

The talc in these compositions is functioning as a stiffening agent. It is known that flexural modulus will increase with increasing weight percent of stiffening agents. Virtually any inert particulate matter which can be incorporated into polypropylene will cause some stiffening. Generally, 0-30% by weight of a stiffening agent is used depending upon desired stiffness and compatibility. A preferred range in view of other properties such as impact resistance and elongation is 20-25% by weight. Provided the polyoxyethylene alkyl ether used does not chemically react with the stiffening agent, there is observed an increase in both flow rate and impact resistance of such polypropylene compositions.

The specific examples shown herein are intended to clarify the invention. Variations on the specific examples are readily apparent to those skilled in the art based upon the teachings herein and are within the scope of the intended invention.

TABLE 6

THE EFFECT OF RENEX 36 ON THE PROPERTIES OF 1004 POLYPROPYLENE CONTAINING ECD 3252 AND 10% talc

| Additives | | | | | |
|---|---|---|---|---|---|
| % Metrotalc 4615 | 10 | 10 | 10 | 10 | 10 |
| % ECD 3252 | 15 | 15 | 15 | 12 | 10 |
| % Renex 36 | — | 4 | 5 | 5 | 7 |
| Flow Rate (-G/10 min.) | | | | | |
| Condition L | 4.4 | 4.8 | 5.6 | 5.0 | 6.5 |
| Izod Impact Strength | | | | | |
| (ft-lb/in., ⅛ in. bar) | | | | | |
| Notched at 73° F | 1.19 | 2.80 | 2.40 | 1.94 | 1.66 |
| Unnotched at 73° F | no break | no break | no break | no break | no break |
| Tensile Properties: | | | | | |
| Yield Tensile Strength (psi) | 3990 | 3610 | 3340 | 3670 | 3740 |
| Ultimate Tensile Strength (psi) | 2960 | 1780 | 2690 | 1910 | 1870 |
| Elongation at Yield (%) | 8.6 | 10.8 | 10 | 10.2 | 11.4 |
| Elongation at Break (%) | 91 | 450 | 240 | 358 | 448 |
| Flexural Modulus | 223,000 | 239,000 | 182,000 | 261,000 | 198,000 |
| Rockwell Hardness | 81R | 63R | 54R | 65R | 66R |
| Heat Deflection Temp. (° F at 66 psi) | 222 | 198 | 214 | 211 | 208 |
| Gardner Impact (in-lb at −20° F) | 18-20 | 28 | 23-27 | 25 | 23 |

That which is claimed is:

1. An impact and flow modified polypropylene composition comprising:
   a. a polypropylene having a flow rate, determined according to ASTM D1238 Condition L, in the range of 0.2 to 25 grams/10 minutes; and
   b. a polyoxyethylene alkyl ether derivative, in an amount effective to increase both impact resistance at room temperature and flow rate of said composition, selected from the group consisting of:
   i. a compound defined by a first formula:

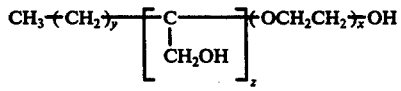

where in said first formula $x$, $y$, and $z$ are selected from the group consisting of: (1) $x$ which is in the range 3-10, $y$ which is in the range 12-15, and $z$ which is 1; and (2) $x$ which is in the range 5-12, $y$ which is in the range 11-13, and $z$ which is 0; and ii. a compound defined by a second formula:

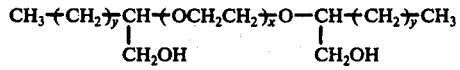

where in said second formula the $x$ and each $y$ are individually selected from the group consisting of:
   1. $x$ is in the range 7-11, and $y$ which is in the range 12-15; and
   2. $x$ which is in the range 12-14, and $y$ which is in the range 8-11.

2. The composition of claim 1, wherein the polyoxyethylene alkyl ether derivative is used in the amount of 0.5 to 10 weight percent based upon the total composition.

3. The composition of claim 1, wherein an impact modifier comprising an ethylene-propylene copolymer rubber, having 40-75% ethylene, or a diene modification thereof, is used in the amount of 5-30 weight percent based upon the total composition.

4. The composition of claim 1, wherein is added a stiffening agent to increase flexural modulus.

5. The composition of claim 4, wherein the stiffening agent is selected from the group consisting of talc, calcium carbonate, lithopone, titanium dioxide, hydrated aluminas, fiberglass, and clay.

6. The composition of claim 1, wherein the following are added:
   a. an impact modifier; and
   b. a stiffening agent.

7. The composition of claim 6, wherein
   a. the impact modifier is an ethylene-propylene copolymer rubber having 40 to 75% ethylene or a diene modification thereof; and
   b. the stiffening agent is a material selected from the group consisting of talc, calcium carbonate, lithopone, titanium dioxide, hydrated aluminas, fiberglass, and clay.

8. The composition of claim 1,
   i. where in said first formula the $x$, $y$, and $z$ are selected from the group consisting of: (1) $x$ which is in the range 3-6, $y$ which is in the range 12-15, and $z$ which is 1; and (2) $x$ which is in the range 5-7, $y$ which is in the range 11-13, and $z$ which is 0; and
   ii. where in said second formula the $x$ and $y$ are individually selected from the group consisting of: $x$ which is in the range 7-10, and $y$ which is in the range 12-15.

9. The composition of claim 1, where in said first formula the $x$, $y$, and $z$ are selected from the group consisting of: $x$ which is 6, $y$ which is 12, and $z$ which is 0.

* * * * *

UNITED STATES PATENT OFFICE
CERTIFICATE OF CORRECTION

Patent No. 4,048,131  Dated September 13, 1977

Inventor(s) R. G. Keske et al

It is certified that error appears in the above-identified patent and that said Letters Patent are hereby corrected as shown below:

Column 10, line 58 "x and y" should be -- x and each y --

Column 3, line 1  "compatible" should read -- incompatible --

Column 5, line 6  "HO - $CH_2CH_2$- O - H" should read

-- $HO-[CH_2CH_2-O]_n-H$ --

Column 6, line 56 "octyl" should read -- cetyl --

Signed and Sealed this

Fourth Day of July 1978

[SEAL]

Attest:

RUTH C. MASON
*Attesting Officer*

DONALD W. BANNER
*Commissioner of Patents and Trademarks*